United States Patent
Kraus

(10) Patent No.: US 6,287,043 B1
(45) Date of Patent: Sep. 11, 2001

(54) CONNECTION BETWEEN A SUPPORT AND A PLATE ELEMENT

(75) Inventor: Willibald Kraus, Grünstadt (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/251,522

(22) Filed: Feb. 17, 1999

(30) Foreign Application Priority Data

Feb. 18, 1998 (DE) .............................................. 198 06 827

(51) Int. Cl.⁷ ...................................................... F16B 13/06
(52) U.S. Cl. .............................. 403/297; 24/458; 24/292; 411/48; 411/508
(58) Field of Search .................................... 403/297, 280, 403/282; 24/458, 292, 297; 411/41, 45, 46, 47, 48, 508, 509

(56) References Cited

U.S. PATENT DOCUMENTS

| 3,110,068 | * | 11/1963 | Perrochat | 24/297 |
| 4,122,583 | | 10/1978 | Grittner et al. | |
| 4,270,328 | * | 6/1981 | Page et al. | 24/292 X |
| 4,648,766 | | 3/1987 | Wollar | |
| 5,094,579 | * | 3/1992 | Johnson | 411/45 X |
| 5,106,255 | * | 4/1992 | Andre et al. | 403/297 X |
| 5,178,501 | * | 1/1993 | Carstairs | 241/297 X |
| 5,540,528 | * | 7/1996 | Schmidt et al. | 411/41 X |
| 5,846,039 | * | 12/1998 | Kirchen et al. | 411/48 X |
| 6,039,523 | * | 3/2000 | Kraus | 411/48 |

FOREIGN PATENT DOCUMENTS

| 248728 | * | 7/1953 | (AU) | 411/46 |
| 10983291 | * | 3/1981 | (CA) | 411/509 |
| 27 18 170 A1 | | 10/1978 | (DE) | . |
| 2 249 451 | | 4/1979 | (DE) | . |
| 694401 | * | 7/1953 | (GB) | 411/508 |
| 1501529 | * | 2/1978 | (GB) | 411/45 |

* cited by examiner

Primary Examiner—Lynne H. Browne
Assistant Examiner—David E. Bochna
(74) Attorney, Agent, or Firm—Fay, Sharpe, Fagan, Minnich & McKee, LLP

(57) ABSTRACT

A connection (1) between a support (2) and a plate element includes an upper part (3), attachable to the plate element, and a lower part (4), connectable to the support (2). A neck-shaped intermediate region (5), between the upper and lower parts (3, 4, respectively), includes locking elements (10). A contact piece (12) on the lower part (3) has counter stops (14) and a first flange (16). The intermediate region (5) penetrates in an anterior region of the contact piece (12). The contact piece (12) spreads behind the support (2) after being inserted through an opening (7) in the support (2). A flexible hose gasket (20), surrounding the intermediate region (5), is in a substantially cylindrical shape when the connection (1) is in a pre-mounted position.

13 Claims, 4 Drawing Sheets

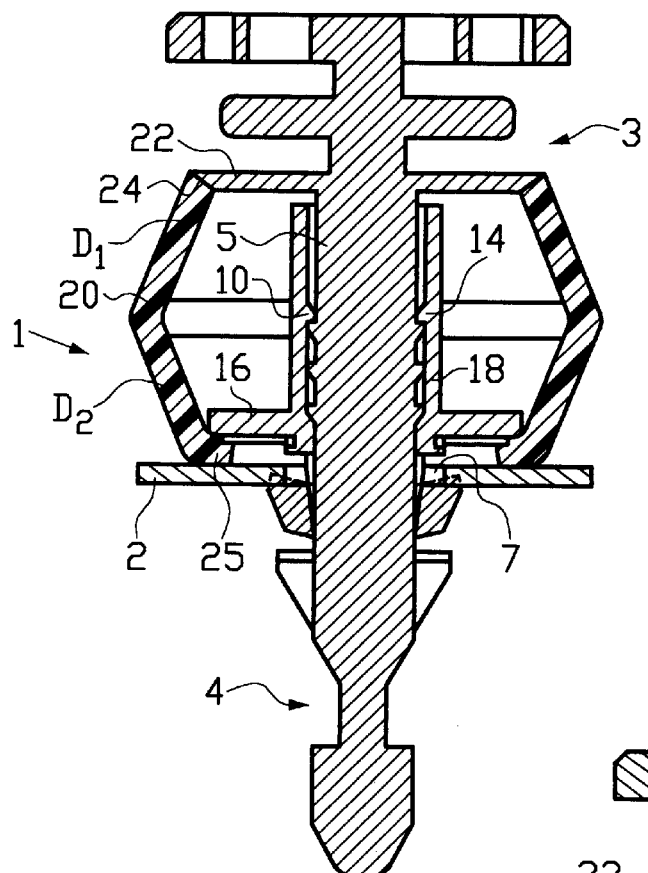
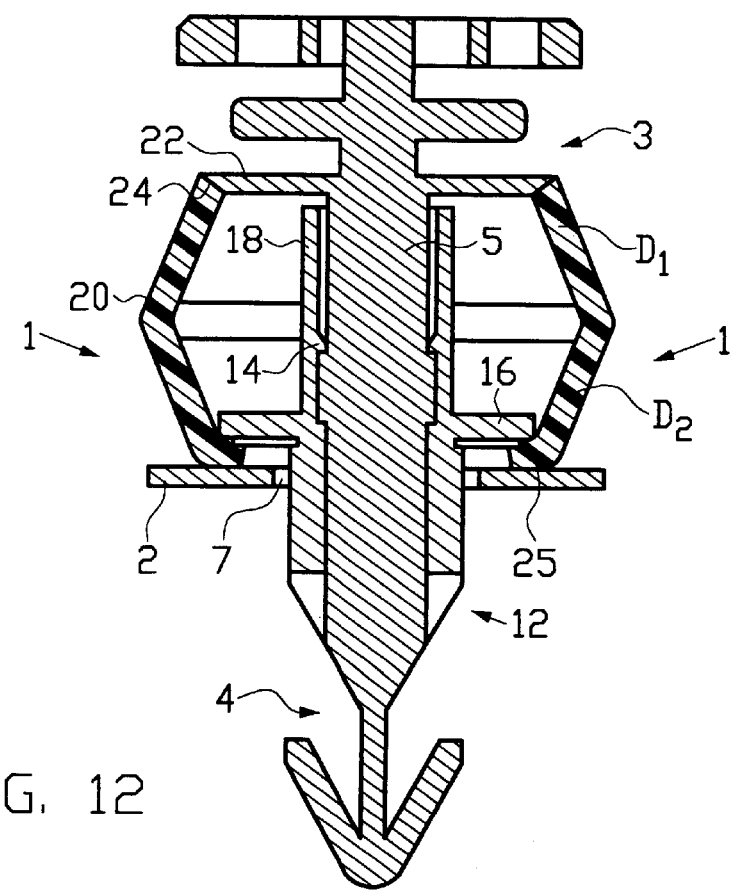
FIG. 11
FIG. 12

CONNECTION BETWEEN A SUPPORT AND
A PLATE ELEMENT

BACKGROUND OF THE INVENTION

The present invention relates to a connection between a support and a plate element. It finds particular application in conjunction with a connection between a body part of a motor vehicle and a door face, and will be described with particular reference thereto. It will be appreciated, however, that the present invention is also amenable to other like applications.

Conventional connections between a support (e.g., body part of a motor vehicle) and a plate element (e.g., a door face) include an upper part and a lower part. The upper part attaches to the plate element while the lower part attaches to the support. A neck-shaped intermediate region of the connection, between the upper and lower parts, is equipped with locking elements. The intermediate region penetrates into an anterior region of a contact piece. The contact piece is embedded in a support opening and is equipped with counter stops. In a mounted position, the contact piece spreads behind the support opening.

The conventional constructions guarantee excellent tolerance compensation over a large region due to interaction of the locking elements of the neck-shaped intermediate region and the counter stops. Furthermore, the intermediate region in the anterior portion penetrates the contact piece and spreads the contact piece behind the support opening, for example, a door opening of a motor vehicle. Therefore, the conventional constructions create a secure attachment of the connection piece to the support. However, conventional constructions fail to adequately seal the support opening. In order to achieve such a seal using conventional constructions, costly structural reconstructions have been necessary.

The present invention provides a new and improved apparatus and method which overcomes the above-referenced problems and others.

SUMMARY OF THE INVENTION

A connection (1) between a support (2) and a plate element includes an upper part (3), attachable to the plate element, and a lower part (4), connectable to the support (2). A neck-shaped intermediate region (5), between the upper and lower parts (3, 4, respectively), includes locking elements (10). A contact piece (12) on the lower part (3) has counter stops (14) and a first flange (16). The intermediate region (5) penetrates in an anterior region of the contact piece (12). The contact piece (12) spreads behind the support (2) after being inserted through an opening (7) in the support (2). A flexible hose gasket (20), surrounding the intermediate region (5), is in a substantially cylindrical shape when the connection (1) is in a pre-mounted position.

In accordance with one aspect of the invention, the support is a motor vehicle and the plate element is a body part of the motor vehicle.

In accordance with another aspect of the invention, the plate element is a door facing of the motor vehicle.

In accordance with another aspect of the invention, a lower portion of the upper part (3) includes a second flange (22). The hose gasket (20) flexes to a second shape and is sealed between the second flange (22) and the support (2) when the connection (1) is in an installed position.

In accordance with another aspect of the invention, the hose gasket (20) flexes to a shape including first and second cones ($D^1$, $D^2$) when the connection (1) is in the installed position.

In accordance with a more limited aspect of the invention, a lower portion (25) of the hose gasket (20) is clamped between the support (2) and the first flange (16), for creating a seal around the support opening (7) when the connection (1) is in the installed position.

In accordance with a more limited aspect of the invention, a portion of the contact piece (12) above the first flange (16) includes a casing (18). The counter stops (14) are arranged around an interior circumference of the casing (18).

In accordance with another aspect of the invention, the second flange (22) includes a conically tapering edge (24) acting upon a top portion of the hose gasket (20).

In accordance with another aspect of the invention, the hose gasket (20) includes at least one of a rubber and a synthetic material.

One advantage of the present invention is that a connection is achieved between a support (2) and a plate element without requiring costly structural reconstructions.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 11 illustrates a sectional view of the connection along the line XI—XI of FIG. 10; and FIG. 12 illustrates a sectional view of the connection along the line XII—XII of FIG. 7.

DETAILED DESCRIPTION OF THE
PREFERRED EMBODIMENTS

With reference to FIGS. 1–5, a connection 1 according to the present invention is depicted in a pre-mounted position. The connection 1, which includes an upper part 3 and a lower part 4, is connectable to a support. In the preferred embodiment, the upper part 3 includes at least two (2) flanges arranged at an axial distance from each other.

Figure 1:
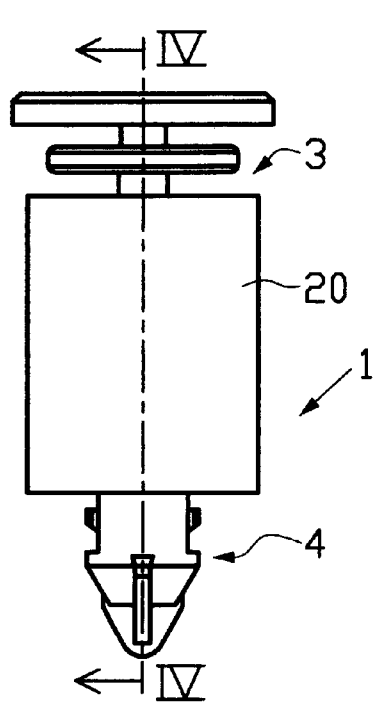
FIG. 1 illustrates a first lateral view of the connection according to the present invention with the hose gasket in the pre-mounted position.
Figure 2:
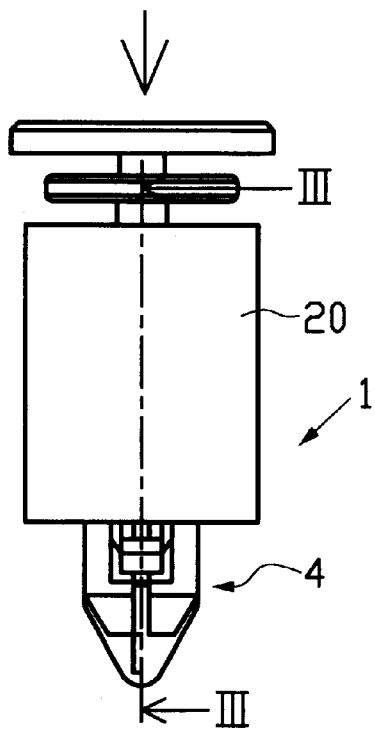
FIG. 2 illustrates a second lateral view of the connection shown in FIG. 1.
Figure 3:
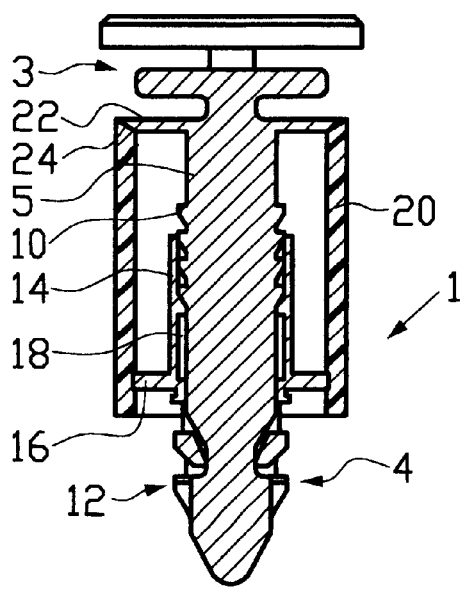
FIG. 3 illustrates a sectional view of the connection along the line III—III of FIG. 2.

As shown in FIG. 3, a neck-shaped intermediate region 5 is provided between the upper part 3 and the lower part 4. The intermediate region 5, which is equipped with locking elements 10, penetrates an anterior region of a contact piece 12. The contact piece 12, which may be embedded in an opening in the support, is equipped with counter stops 14.

Figure 4:
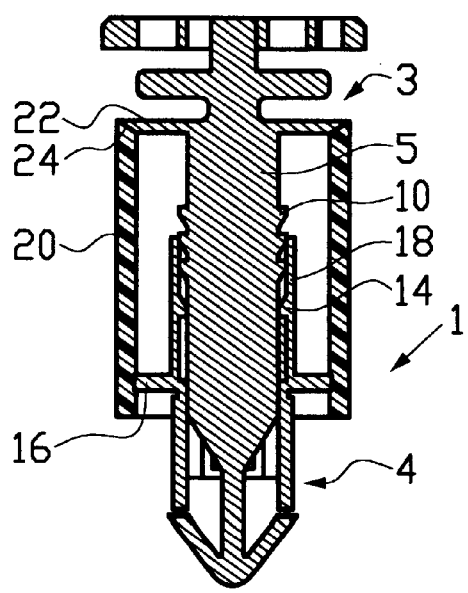
FIG. 4 illustrates a sectional view of the connection along the line IV—IV of FIG. 1.
Figure 5:
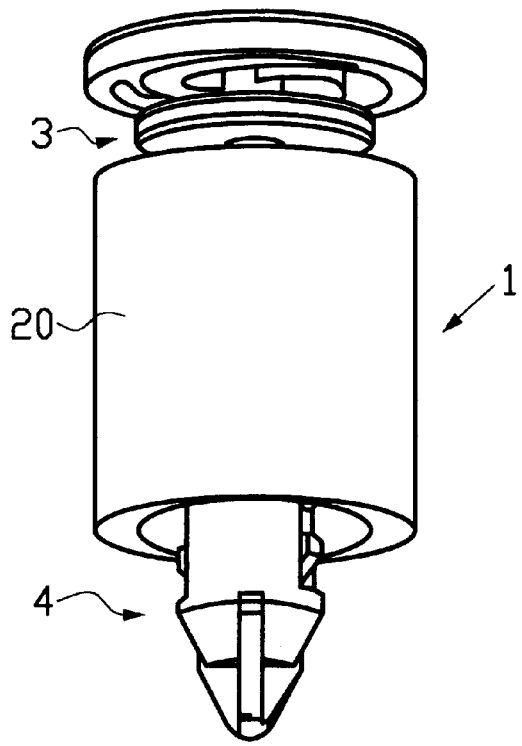
FIG. 5 illustrates a first perspective view of the connection in the pre-mounted position.
Figure 6:
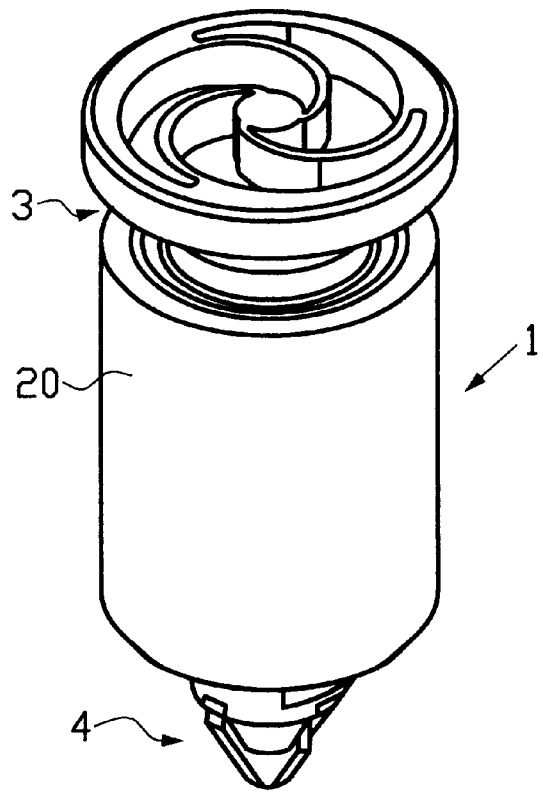
FIG. 6 illustrates a second perspective view of the connection in the pre-mounted position.
Figure 7:
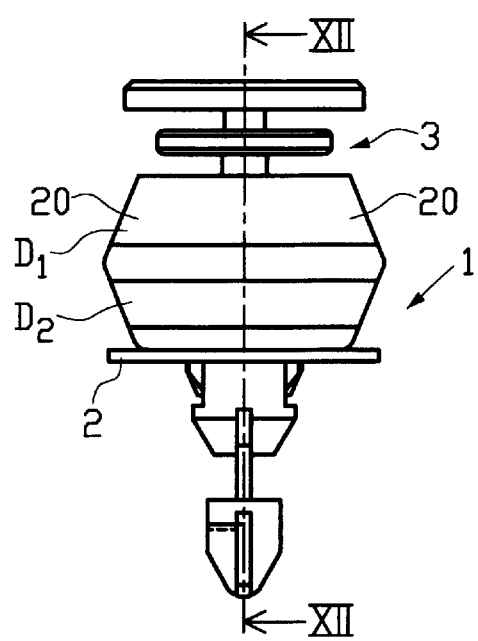
FIG. 7 illustrates a first lateral view of the connection in an installed position.
Figure 8:
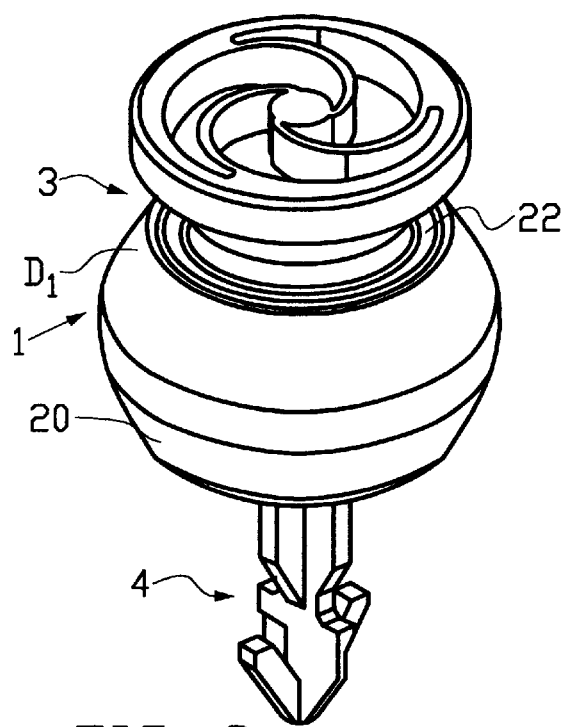
FIG. 8 illustrates a first perspective view of the connection in the installed position.
Figure 9:
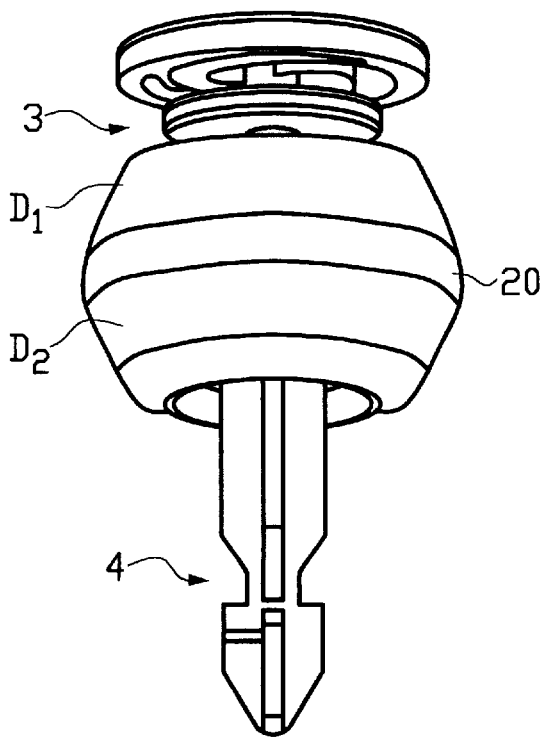
FIG. 9 illustrates a second perspective view of the connection in the installed position.

With reference to FIGS. 3 and 4, a cylindrically-shaped hose gasket 20 is arranged between a lower region of the upper part 3 and a flange 16 of the contact piece 12. The hose gasket 20 surrounds the intermediate region 5. The portion of the contact piece 12 above the flange 16 acts as a casing 18 that surrounds a portion of the intermediate region 5. The counter stops 14 of the contact piece 12 are arranged around the inner circumference of the casing 18 and interact with the locking elements 10 of the intermediate region 5. In this pre-mounted position, the connection according to the present invention may be installed in an opening of a support.

In the preferred embodiment, the hose gasket 20 includes a rubber and/or a synthetic material. Alternatively, the hose gasket 20 may also include a plastic material.

Figure 10:
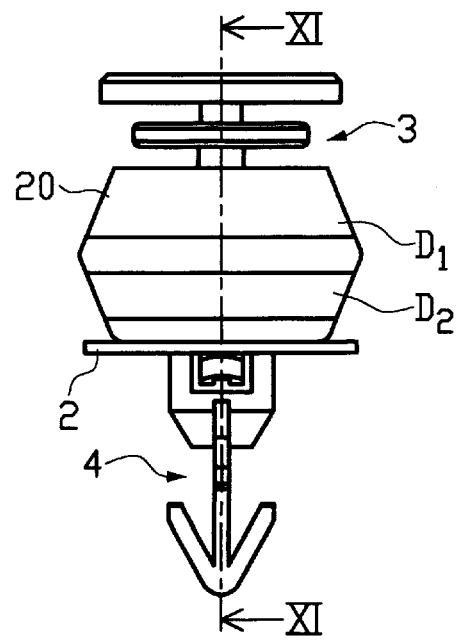
FIG. 10 illustrates a second lateral view of the connection in the installed position.

FIGS. 11 and 12 illustrate a support 2 (e.g., a body of a motor vehicle) including a support opening 7. While in the pre-mounted position (see FIGS. 1–6), the connection 1 may be installed into the opening 7 of the support 2. In order to install the connection 1, the connection 1 is first aligned with the support opening 7. Next, pressure is exerted on the upper part 3 of the connection 1, as indicated by the downward-facing arrow in FIG. 2. The pressure causes the contact piece 12 to pass through and expand behind the support opening 7 (see FIGS. 10–12), thereby preliminarily securing the connection 1 within the support opening 7. After the connection 1 is preliminarily secured, additional pressure is exerted on the upper part 3, thereby causing the locking elements 10 of the intermediate piece 5 to engage the corresponding counter-stops 14 of the casing 18. The additional pressure is exerted until the connection 1 is securely locked into an installed position by the interaction between the locking elements 10 and the counter-stops 14.

As the connection 1 is transformed from the pre-mounted position (see FIGS. 1–6) into the installed position (see FIGS. 7–12), the hose gasket 20 is deformed from the cylindrically-shaped hose into two (2) cone-shaped segments $D^1$, $D^2$. The respective wider ends of the cone-shaped segments $D^1$, $D^2$ face one another. The deformation of the hose gasket 20 results because of a flange 22 in the lower region of the upper part 3. The flange 22 preferably possesses a conically tapering edge 24, which is sealed to the hose gasket 20. As the connection 1 is transformed from the pre-mounted position into the installed position, the edge 24 acts upon a top portion of the hose gasket 20. More specifically, as the pressure is exerted on the upper part 3, the edge 24 presses upon the top portion of the hose gasket 20. The pressure from the edge 24 causes the hose gasket 20 to transform from the cylindrical shape, shown in FIGS. 1–6, into the double-cone shaped segment, shown in FIGS. 7–12.

FIGS. 11 and 12 illustrate that the additional pressure exerted on the upper part 3 of the connection 1 causes a bottom portion 25 of the hose gasket 20, which is next to the support 2, to become clamped between the flange 16 and the surface of the support 2. In this position, the hose gasket 20 effectively seals the support opening 7. Furthermore, the interaction between the locking elements 10 and the counter stops 14, and also between the corresponding holding elements of the contact piece 12, cause the connection 1 to be securely attached to the support 2.

It is to be understood that the upper part 3 of the connection 1 is attached to a plate element (e.g., a door face of the motor vehicle). In this manner, the connection 1 connects the support 2 to the plate element. Furthermore, the connection 1 of the present invention allows strict tolerances while creating a functionally secure seal around the support opening 7.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A connection between an associated support and an associated plate element, comprising:

an upper part carrying a first flange, the upper part being selectively attachable to the associated plate element;

a lower part selectively connectable to the associated support;

a neck-shaped intermediate region, between the upper and lower parts, including locking elements;

a contact piece on the lower part having counter stops and a second flange, the intermediate region penetrating in an anterior region of the contact pieces, the contact piece spreading behind the support after being inserted through an opening in the support, portion of the contact piece above the second flange including a casing, said counter stops being arranged around an interior circumference of the casing;

a flexible gasket, surrounding the intermediate region, the flexible gasket having a substantially cylindrical shape when the connection is in a pre-mounted position, and flexing to a second shape including first and second cones and being sealed between the second flange and the support when the connection is in an installed position, a lower portion of the gasket being clamped between the support and the second flange for creating a seal around the support opening when the connection is in said installed position.

2. The connection as set forth in claim 1, wherein:

the associated support is a motor vehicle; and the associated plate element is a body part of the motor vehicle.

3. The connection as set forth in claim 2, wherein the associated plate element is a door facing of the motor vehicle.

4. The connection as set forth in claim 1 wherein the first flange includes a conically tapering edge acting upon a top portion of the gasket.

5. The connection as set forth in claim 1, wherein the gasket includes at least one of a rubber and a synthetic material.

6. A connection between an associated first element and an associated second element, the connection comprising:

an upper part selectively attachable to the second element;

a lower part selectively connectable to the first element;

a neck-shaped intermediate region disposed between the upper and lower parts, the intermediate region including locking elements;

a contact piece on the lower part, the contact piece including a first flange and a casing having counter stops arranged around an interior circumference of the casing, the intermediate region penetrating an anterior region of the contact piece, the contact piece spreading behind the first element after being inserted through an opening in the first element; and, a flexible gasket surrounding the intermediate region, the flexible gasket having a first shape when the connection is in a pre-mounted position and having a second shape when in an installed position, the locking elements interacting with the counter stops and the connection transforming from the pre-mounted position to the installed position when pressure is exerted on the upper part, a lower portion of the gasket being clamped between the first element and the first flange when the connection is in the installed position, thereby providing a seal around the opening.

7. The connection as set forth in claim 6, wherein:

the associated first element includes a motor vehicle; and the associated second element includes a body part of the motor vehicle.

8. The connection as set forth in claim 6, wherein a lower portion of the upper part includes a second flanges, the gasket flexing to the second shape and being sealed between the second flange and said associated second element when the connection is in the installed position.

9. The connection as set forth in claim 8, wherein the gasket is in a substantially cylindrical shape while the connection is in the pre-mounted position, and the gasket is in a shape including two cone-shaped segments while the connection is in the installed position.

10. A connector for connecting an associated plate member with an associated support, the connector comprising:

an elongate member having first and second ends, the first end being adapted for selective attachment to the associated plate member and carrying a first flange;

a contact member adapted for embedded insertion into an opening in the associated support and being selectively lockable with the elongate member in a pre-mounted relative position and in an installed relative position, the contact member engaging a back surface of the associated support member after being inserted through said opening; and, a flexible gasket member adapted to be held between the first flange and a front surface of the associated support to engage the front surface and seal said opening when the elongate member and the contact member are in said installed position, the flexible gasket member flexing to a shape including first and second cones between the first flange and the front surface of the associated support when the elongate member and the contact member are in said installed position.

11. The connector according to claim 10 wherein:

the contact member includes a second flange on said second end; and, a portion of the flexible gasket member is selectively clamped between the second flange and said front surface of the associated support when the elongate member and the contact member are in said installed position.

12. The connector according to claim 10 wherein at least one of the elongate member and the contact member carries a one of a locking element and a counter stop, and the other one of the elongate member and the contact member carries the other one of the locking element and the counter stop.

13. The connector according to claim 12 wherein the elongate member carries said locking element and the contact member carries said counter stop.

* * * * *